June 9, 1925.  1,540,904
H. SCHLAICH
COMBINED SPOT AND PARKING LIGHT
Filed Nov. 8, 1921  2 Sheets-Sheet 1
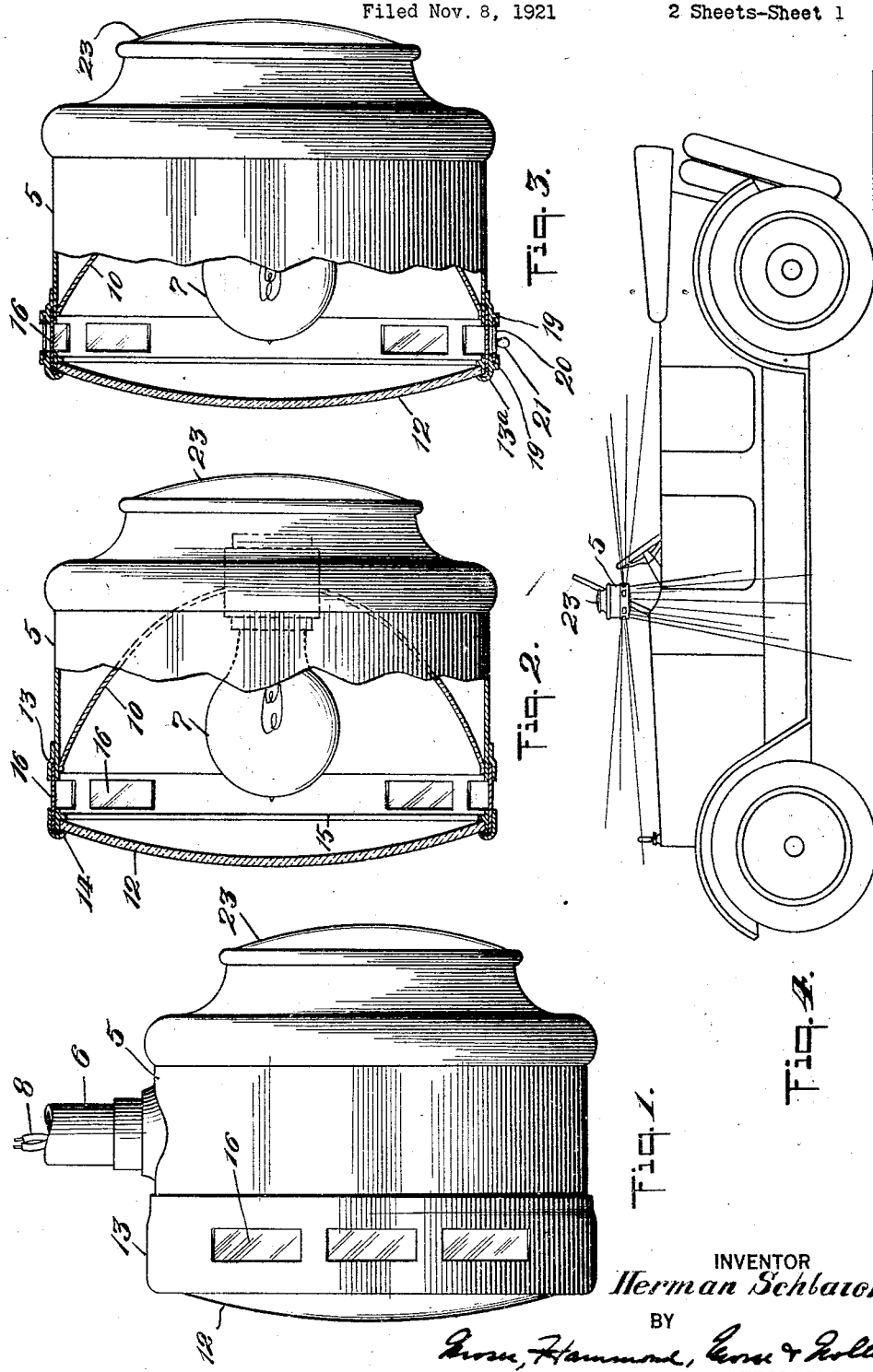
INVENTOR
*Herman Schlaich*
BY
ATTORNEYS

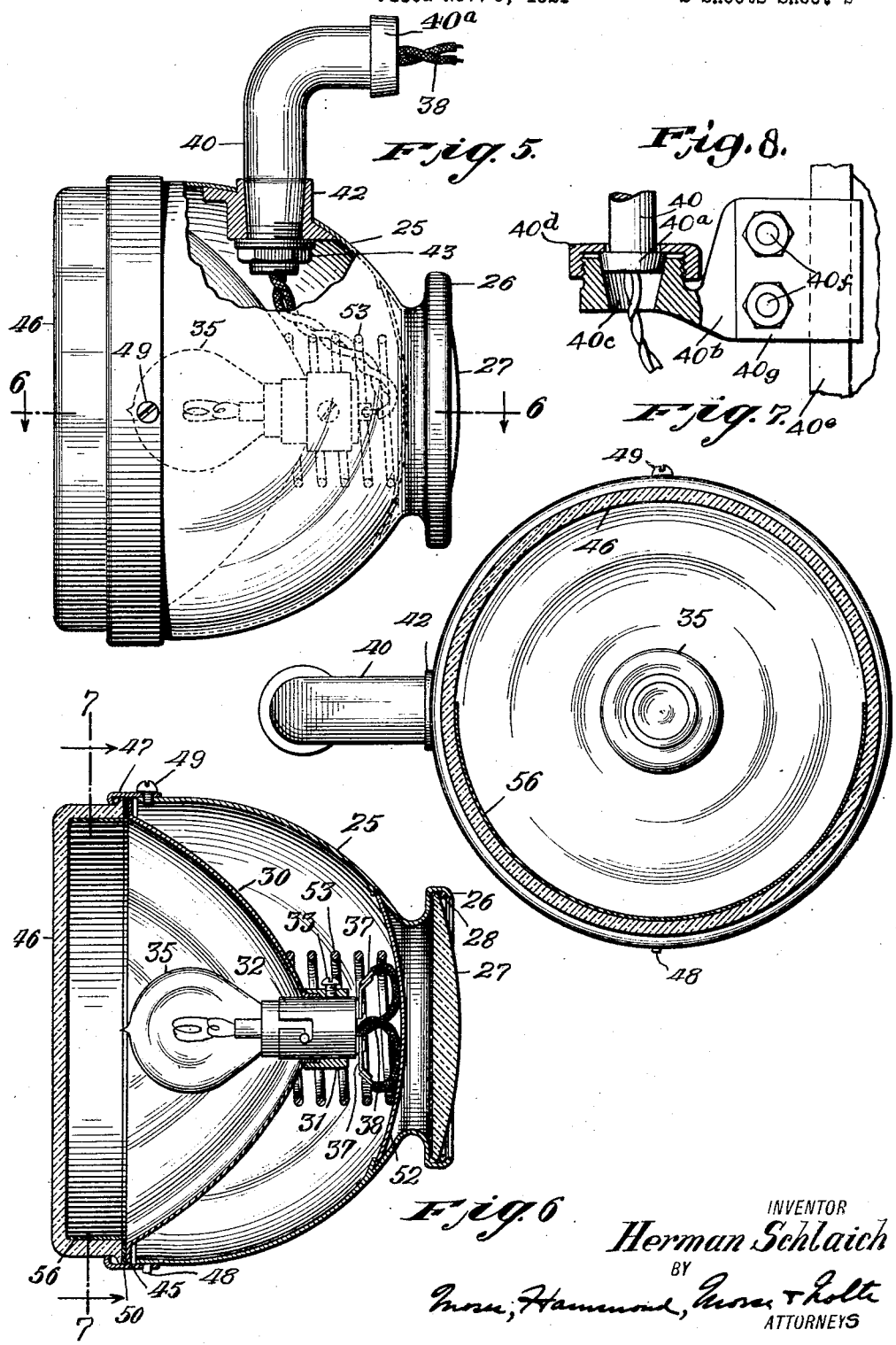

Patented June 9, 1925.

1,540,904

UNITED STATES PATENT OFFICE.

HERMAN SCHLAICH, OF LONG ISLAND CITY, NEW YORK.

COMBINED SPOT AND PARKING LIGHT.

Application filed November 8, 1921. Serial No. 513,703.

*To all whom it may concern:*

Be it known that I, HERMAN SCHLAICH, a citizen of the United States, residing in Long Island City, county of Queens, and State of New York, have invented certain new and useful Improvements in Combined Spot and Parking Lights, of which the following is a specification.

It has become customary to provide motor driven vehicles with spot-lights which are usually mounted on the frame of the windshield so as to be capable of universal movement, and which serve to throw a concentrated beam of light in any desired direction.

It has also been proposed to provide a motor driven vehicle with a parking-light which may contain a lamp of small candle power and which, when the car is left standing, will radiate light in both forward and rearward directions and will make it unnecessary to leave illuminated either the head-lights or the tail-light of the vehicle.

The general object of the present invention is to provide a light which will satisfactorily serve both as a spot-light and as a parking-light for vehicles. In attaining this object, I have provided a light adapted to be supported for universal movement and provided with a casing having a translucent portion through which the spot-beam is projected, and other translucent portions for emitting light for parking purposes in directions at substantially right angles to the direction of the spot-beam. In this light, I prefer to use a high-and-low candle power lamp, such as a double filament lamp. In addition, I may provide the light with a movable shutter which may be used to close the translucent portions of the casing through which light is emitted for parking purposes.

The invention will be understood from the following description, taken in connection with the accompanying drawing, in which Figure 1 is a plan view of a combined spot and parking light embodying the invention; Figure 2 is an elevation thereof, partly in section; Figure 3 is an elevation, partly in section, of the light shown in Figures 1 and 2, provided with a shutter for the translucent portions through which light is emitted for parking purposes; Figure 4 shows an automobile with the combined spot and parking light of Figures 1 and 2 mounted thereon and arranged in parking position; Figure 5 is a plan view, partly in section, of a modified form of the invention; Figure 6 is a sectional elevation on line 6—6 of Figure 5; Figure 7 is a sectional elevation on the line 7—7 of Figure 6; and Figure 8 is a fragmentary elevation, partly in section, showing a bracket by means of which the lamp casing may be mounted upon a vehicle.

Referring to the drawing, particularly Figures 1, 2 and 3, the light is shown as having a casing 5, of any suitable form, which is mounted on a hollow arm 6 attached to any suitable and well known form of bracket adapted to be attached to the wind-shield frame of a motor driven vehicle, the light being supported for universal movement. One form of such mounting is shown in Figure 8 and is hereinafter described in connection with that form of the invention illustrated in Figures 5, 6 and 7. Mounted within the casing 5 is a lamp 7, preferably of the double filament variety, which receives current through wires 8 under the control of a switch at any convenient location. Mounted within the casing behind the lamp 7 is a reflector 10 adapted to project a concentrated beam or "spot-beam" of light. The casing 5 is provided with a translucent end which may consist of a crystal 12 secured to the casing in any suitable manner as by a ring 13 having a turned in edge 14 which engages the outside of the edge of the crystal 12 and holds the inside of the edge of the crystal tightly against a boss 15 on the inside of the casing 5. The ring 13 may also serve as a frame for holding a strip of translucent material 16, such as sheet celluloid, in position over registering openings in the cylindrical side of the casing 5 and in the ring 13, as shown in Figure 2. The transparent material 16 is preferably white throughout that portion which covers the openings in the upper part of the casing, and is red throughout that portion which covers the openings in the lower part of the casing, for reasons hereinafter explained. The inner edge of the ring 13 makes snug engagement with the outside of the casing 5, and thus holds the parts in their assembled positions.

The light shown in Figure 3 is the same as the light shown in Figures 1 and 2, except that a shutter is provided for covering the translucent portions of the casing through which light is emitted for parking purposes. As shown, the ring 13ª which holds in position the crystal 12 and the strip 16 of translucent material, is provided with channeled lugs 19 adapted to hold a shutter 20 which may consist of a band of sheet metal provided with one or more outwardly extending knobs 21. The shutter 20 is provided with openings adapted to register with the openings in the casing 5 and in the ring 13. When all of the said openings are in register, light is permitted to emerge through them for parking purposes; and when the light is not being used for parking purposes the shutter 20, by means of the knob 21, may be moved through substantially 90° until the apertures in the shutter are out of register with the apertures in the ring 13 in the casing 5, thereby preventing light from emerging through the cylindrical portion of the casing 5.

If desired, the back of the casing 5 may be provided with a mirror 23 which, when the light casing is properly adjusted on its supporting bracket, will enable the operator to observe what is approaching from behind the vehicle.

Figure 4 shows the form of the invention shown in Figures 1 and 2 mounted on an automobile and adjusted so as to serve as a parking light. From this figure, it will be noted that the light not only emits white rays in a forward and red rays in a rearward direction, thereby providing a warning to vehicles approaching both from the front and from the rear of the vehicle; but also sheds light downwardly upon the side of the vehicle, thereby making the latter clearly visible when closely approached.

In Figures 5, 6 and 7 is illustrated another embodiment of the invention which has certain features of construction which are particularly advantageous. In this light, the casing 25 may be of the simple form shown and may be provided at its rear end with a flange 26 adapted to receive a convex mirror 27 which may be retained within the flange in any suitable manner as by a ring 28. Within the casing 25 is a reflector 30, of the form shown, which at its center is provided with a flange 31 adapted to receive a lamp socket 32 which may be retained within said flange by means of a set screw 33. As shown, the lamp socket 32 is of the bayonet type; and a lamp 35 of the double filament variety is shown inserted in said lamp socket. The rear of the lamp socket 32 is shown as provided with terminals 37 to which are secured conductors 38 which may be led out through the hollow bracket arm 40; upon which the casing 25 is rotatably supported through the medium of a flange 42, secured to said casing, and a nut 43 threaded on the inner end of bracket arm 40 and adapted to cooperate with the inside of the flange 42. As best shown in Figure 8, the bracket arm 40 is provided at its outer end with a collar 40ª, adapted to cooperate with the bracket 40ᵇ, in a cavity 40ᶜ of which said collar is held by a nut 40ᵈ. The bracket 40ᵇ is preferably adapted to cooperate with the wind shield frame 40ᵉ of the vehicle, to which it is secured by the bolts 40ᶠ which pass thru the bracket 40ᵇ and a clamping plate 40ᵍ between which the frame 40ᵉ is gripped. By the construction just described, the lamp casing 25 is supported in a manner which permits its universal movement on the vehicle, as is customary in connection with spot lights. It will, of course, be understood that this particular construction of lamp mounting forms no part of the present invention, and that it may be modified in many respects without departing from the spirit thereof.

At its outer edge, the reflector 30 is preferably formed into a flange 45, the outer diameter of which is about the same as the outer diameter of the casing 25 at its open end. The light is provided with a crystal 46 which is preferably pan-shaped, or provided with an annular portion out of the plane of the main portion as shown, and is provided with a flanged edge conforming in shape to the edge of the reflector 30. Adapted to cooperate with the edge of the crystal 46, is a retaining ring 47 which may be secured to the casing 25 in any suitable manner, as by means of a pin 48 and a screw 49. The ring 47 is provided with an outer in-turned edge which engages the outside of the edge of the crystal 46; and the ring 47 thus serves as a housing around the flanged edges of the reflector 30 and the crystal 46 between which a gasket 50 of yielding material is preferably interposed. Secured in the back of the casing 25 in any suitable manner is a disk 52 which, like the casing, may be of sheet metal. Between the back of the reflector 30 and the disk 52 is interposed a coiled spring 53 which is adapted to force the reflector 30 toward the crystal 46 and the latter into engagement with the flanged edge of the ring 47. The crystal 46 is thus held in a manner which prevents rattling; and a dust tight joint between the crystal 46 and the reflector 30 is provided. The crystal 46 is preferably painted red, or lined with red translucent material, throughout the lower half of its annular portion, as shown at 56.

It will be obvious that, with the form of the invention shown in Figures 5, 6 and 7, light is emitted both axially and radially through the crystal; and that when the spot-beam is directed downwardly for parking purposes, the rays which are emitted in a forward direction through the edge of the crystal will be white, whereas those emitted rearwardly will be red. In this embodiment of the invention, therefore, the edge portion of the crystal may be regarded as part of the casing; and the device serves the same purpose as the embodiment shown in Figures 1, 2, and 4.

In all of the embodiments of the invention herein described, a two filament lamp is preferably employed in order that, when the light is used for parking purposes, current consumption may be reduced to a minimum by the use of the low candle power filament, while the high candle power filament furnishes the light for the powerful spot beam. It will be obvious, however, that two lamps, one of high and one of low candle power may be used; and that a single filament lamp may be employed, and current consumption reduced when the light is used for parking purposes by inserting in series with the lamp a suitable reistance.

In addition to serving as a combined spot and parking light, any of the lights herein described may also be used for illuminating the temperature indicating instrument which is usually mounted upon the radiator cap of a motor driven vehicle. The light can be so used conveniently, when it is not being employed either as a spot light or as a parking light; and when so used, the rays from the low candle power filament, projected as a spot beam, will be sufficient to illuminate the temperature indicating instrument without projecting a dazzling beam in a forward direction, which would be course be objectionable.

While I have shown preferred forms in which the invention may be embodied, it is to be understood that these forms are merely illustrative and that the invention may be embodied in other forms without departing from the spirit as defined in the appended claim.

What I claim is:

In combination with a motor vehicle, a combined spot and parking light mounted for universal movement on the left side of said vehicle and comprising a casing, a lamp and reflector therein, a translucent portion in said casing through which the spot beam of light is projected, and translucent portions in said casing so located that light will shine through said translucent portions toward the front and rear of the vehicle when the spot beam is directed downwardly.

In testimony whereof I have affixed my signature to this specification.

HERMAN SCHLAICH.